UNITED STATES PATENT OFFICE.

CHARLES A. HOLLENBECK, OF ELMHURST, AND AARON C. HORN, OF NEW YORK, N. Y.

WATERPROOF VARNISH COMPOSITION AND PROCESS OF MAKING SAME.

1,190,765. Specification of Letters Patent. Patented July 11, 1916.

No Drawing. Application filed December 30, 1914. Serial No. 879,699.

*To all whom it may concern:*

Be it known that we, CHARLES A. HOLLENBECK and AARON C. HORN, citizens of the United States, and residents, respectively, of Elmhurst, in the county of Queens and State of New York, and New York, in the county of New York and State of New York, have invented certain new and useful Improvements in Waterproof Varnish Compositions and Processes of Making Same, of which the following is a specification.

This invention relates to a process of making a varnish composition and to the product of such process and relates in particular to the production of varnishes having certain novel properties, as will be more fully hereinafter described.

According to the present methods of making oil varnishes, it is customary to melt the resins employed and heat them to a high temperature, until they lose 20 to 25% in weight, by the distillation of more volatile components and by the destructive decomposition or destructive distillation which involves the breaking down of some of the compounds of hydrogen, carbon and oxygen, of a relatively low degree of stability to yield a cracked product of a high degree of hardness which in distinction to the original resin is comparatively soluble in oils and varnish thinners such as turpentine and benzin. Such cracked resins, although prepared from the harder varieties of copal give difficulty in incorporating with siccative oils to produce a varnish composition having the desired degree of waterproofing qualities. The dried coating of an ordinary varnish is more or less porous and by some this defect is ascribed to the result of absorption of oxygen by the drying oil present and the evolution of gases, during the drying process, which causes the film to become permeable to a greater or less degree. The bubbles of gas liberated are of course microscopic in size but moisture will eventually find its way into these spaces and by the action of the weather such places of entry become enlarged and ultimately form fissures, so with aging and weathering the varnish coat becomes marred in appearance and is eventually destroyed. Consequently, it is of great importance for permanency of a varnish coating to produce a film which when dry is substantially impermeable to moisture and by the usual methods, as indicated, there is a considerable degree of difficulty in producing a film having these very desirable qualities.

By the present invention as will be hereinafter detailed in a manner such that those skilled in the art may readily practise same, a varnish composition is derived which possesses waterproofing qualities of a very pronounced character and which furthermore in the preferred form or embodiment of the invention has other desirable and novel properties, including a marked resistance to chemical reagents such as ammonia and similar compounds and which is characterized by a relatively high resistance to solvents such as alcohol, especially somewhat diluted alcohol, which ordinarily quickly affects the surface of common varnishes.

Another feature of the product in its preferred form is that when the dried film is introduced into boiling water, no detrimental action on said film is visually detectable, even after a considerable exposure to such drastic treatment.

A further feature of the present composition is that it flows freely under the brush and yields a fine smooth finish which dries quickly and becomes when dry very hard, while at the same time maintaining a degree of flexibility or elasticity which is unusual in view of the hard durable character of the film.

Another feature of the product in its preferred form is the absence of any substantial skin or film formation when the varnish is allowed to stand in closed containers. Many varnishes and especially those prepared with Chinese wood oil, when preserved in containers such as the ordinary tin cans used in packaging varnish, on being allowed to stand away from the air, except for that which may be present in the dead space of the can exhibit a very objectionable defect, namely that of forming a skin or pellicle over the surface, which in some cases is so tough that it can be broken only with difficulty and which of course represents a loss of varnish material to the consumer. By the present invention it becomes possible to prepare a varnish which does not form to any undesirable extent such a pellicle or skin on standing under these conditions and on which, even when the can of material has been opened and quantities drawn therefrom from time to time so that additional air enters the container, there is ordinarily no formation of a skin of any objectionable thickness. In fact with the present product we have noticed that after a can containing the material has been opened several times, in case a film does form it is of such a character as to be easily broken by tilting the container and in consequence the loss through drying of the varnish therein is not material in any case. In spite of the fact that there is no such undesirable pellicle formation in the container, the film which forms on exposure to the air is of a hard, durable, elastic nature—properties which would not be expected in view of the lack of formation of a tough skin in the container. In a preferred embodiment of this invention the product derived possesses these properties in a marked degree, which feature constitutes another element of novelty of the present composition.

According to the present invention various siccative or drying oils, or even semi-drying oils, including perilla, Chinese wood oil, tomato seed, candle nut, corn, cotton seed, rape seed, fish, whale, castor oil and the like may be used. Preferably however, siccative oils are employed and in particular, we prefer an oil of the nature of Chinese wood oil, capable of being polymerized with gelatinization by heating. Instead of treating such oil or oils with oxygen by protracted boiling, we preferably saturate the oil to a considerable extent with sulfur, which combines with the oil readily when heated therewith, forming what appear to be polymerized sulfureted complexes, consisting of a chain of the Chinese wood oil molecules connected by atoms of sulfur at the place of double bonding, such chain of molecules being of greater and greater length, according to the viscosity and degree of resistance or impenetrability to moisture. The peculiar properties of Chinese wood oil, for example the phenomena of gelatinization by simple heating caused by the presence in predominating amount of oleomargaric glycerid apparently renders this oil especially susceptible to the sulfuring process. According to the latter process the oil is heated with a quantity of sulfur, relatively small in amount, but sufficient to bring about a certain degree of saturation by such interlocking of oil molecules during the chaining action of the sulfur to form sulfureted composite polymers. It is desirable to approximate or somewhat exceed the normal temperature of heat polymerization when forming an oil basis when heating a heat-polymerizable drying oil with sulfur in order to secure the most satisfactory results and to obtain a product which is resistant to many compounds and chemical reagents, such for example as somewhat diluted alcohol, ammonia, salt water and boiling water and one which dries quickly to produce a hard impervious dust-free film, and such result is best obtained by incorporating with the oil, a considerable quantity of hard copal resin, or what is known in the varnish makers' terminology as hard gum. In order to obtain a product of the highest efficiency, the resin is preferably subjected to a re-melting or re-running treatment, which gives the material properties of unusual value for the present purpose. If a varnish resin or hard gum is simply heated to bring about cracking to such an extent as to yield a soluble product the once run resin ordinarily is apparently not capable of producing that peculiar colloidal condition which prevents water penetration to a sufficiently effective extent in the case of dried films of the resulting varnish. On the other hand, if the resin is first melted and run to crack to a condition of solubility and the operation completed at a lower temperature, or preferably if the material is allowed to become cold and solidified and the solidified run resin is heated above the melting point, preferably at a temperature somewhat lower than the original cracking temperature there apparently occur a series of complex chemical changes in the resin by virtue of this duplex melting process, which causes a hardening and polymerization or other intricate change enabling the resin to so intermingle with the oil, that a remarkably durable, tough varnish product is secured. Just what the changes are that take place in the heating of the resin under these conditions is difficult to state but in part they may be a partial breaking down of the resin acids to produce anhydrids which subsequently polymerize during the second heating operation.

A formula which will illustrate the invention along specific lines is the following; a copal gum, or more properly speaking, a copal resin is melted and heated to 610–630° F., until moisture, essential oils and other volatile materials are driven off and the oil suitably cracked, by which operation the resin loses from 15 to 30% of its weight. When this stage is reached the resin is allowed to cool for about 24 hours in order to allow any reaction which may take place under these conditions, to progress to a sufficient degree of completion. The run resin is then melted at a somewhat lower temperature, usually between 450 and 500° F. During the second melting some condensation of the resin molecules apparently occurs. In the meantime a sulfured oil is prepared by heating Chinese wood oil with flowers of sulfur, usually 15 to 25 pounds of sulfur being used to 50 gallons of the oil and the temperature during the operation being carefully controlled. The desired degree of combination to produce the contemplated polymer heretofore referred to is attained by heating the mixture to about 450° F., when a large proportion of the sulfur apparently enters into chemical combination and by the addition at the double bonds produces the complex linkage of oil molecules referred to. In some cases it is feasible to heat so as to leave a quantity of free sulfur which may in part later combine with the resin, thus giving both a sulfured oil and a sulfured resin. Also in some cases the final product may contain free sulfur, which is not objectionable, but is even useful for some purposes, while in other applications the presence of any material amount of free sulfur would be undesirable and the operation should be conducted carefully to secure as near as possible a complete combination of the sulfur with the oil. The proportion of the resin to the oil varies, depending on whether it is desired to produce a long oil varnish for exterior work, or a short oil varnish for interior application. A suitable drier is also incorporated while for this purpose, while other driers may be employed, we find cobalt linoleate to be the most efficient in connection with sulfured oil and we preferably employ this or similar oil-soluble cobalt body, or a compound drier containing cobalt and other metallic drier according to circumstances. When the re-run resin and the sulfured wood oil have been mixed and are suitably combined or incorporated by heating, the product is cooled sufficiently and suitably thinned with any desirable varnish thinner, such as turpentine, benzin, or varnish naphtha, coal tar naphtha and the like. A specific formula traversing the foregoing consists of 100 pounds of copal resin, 18 gallons of sulfured wood oil, 1 pound of cobalt linoleate and 40 gallons of turpentine.

As indicated above the foregoing formula is submitted as illustrative and various modifications or deviations therefrom may be made according to the character of the varnish required for the particular application in hand. While it is desirable to use only the hardest varieties of copal, including kauri gum and also Congo or pontianak for the production of the highest grade of waterproof varnish, it is possible to prepare somewhat lower grade products, which can be rubbed, by the use of small or moderate amounts of colophony, which under these conditions does not need to be hardened by a lime or similar treatment for use in this manner. Similarly, a cheaper but durable varnish may be made by substituting the hard resin largely or entirely by colophony. In the latter case the material dries to a hard tough varnish which when some hard resin is present is so hard that the coating may be eventually rubbed with pumice and water, or with oil. Varnishes may be prepared which flow readily under the brush, due to their fine colloidal character, and will dry dust-free in 5 hours and will be dry in 48 hours, while in 60–72 hours these coatings may be rubbed. In place of colophony, its esters with glycerin and the like may be employed.

Besides the process herein set forth for making a waterproof varnish, involving in its specific aspects of cracking a resin, cooling to solidify, remelting the solidified product, incorporating with a sulfured drying oil and a cobalt drier and thinning the composite to the consistency of varnish, we also embrace in the present invention the product of the process broadly stated or as specifically set forth above, including a colloidal varnish, comprising a reversible resinous colloid, a drier and a polymerized sulfureted siccative oil complex of high molecular weight; also the product comprising remelted resin as a reversible colloid and we further embrace a varnish capable of drying to a tough impervious film on exposure which is substantially or essentially free from pellicle-formation in a closed container.

The several features of our invention are set forth concisely in the appended claims.

What we claim is:—

1. The process of making a waterproof varnish which comprises melting a hard varnish resin and heating to render same soluble in a varnish vehicle, cooling to solidify, remelting the solidified product, incorporating with a sulfured drying oil and a drier, and thinning the composite to the consistency of varnish.

2. The process of making a waterproof varnish which comprises melting a hard varnish resin and heating to render same soluble in a varnish vehicle, cooling to solidify, remelting the solidified product, incorporating with sulfured Chinese wood oil and a drier, and thinning the composite to the consistency of varnish.

3. The process of making a waterproof varnish which comprises melting a hard varnish and heating to render same soluble in a varnish vehicle, cooling to solidify, remelting the solidified product, incorporating with a sulfured drying oil and a drier, and thinning the composite to the consistency of varnish.

4. In a process of making a waterproof varnish the step which comprises remelting a run resin and incorporating the remelted product with a sulfured drying oil.

5. A varnish product consisting of a light colored siccative composition of the consistency of varnish comprising a remelted, cracked, hard varnish resin, a sulfured drying oil, a drier and a thinning vehicle comprising turpentine.

6. A waterproof varnish comprising a depolymerized resin and a sulfured siccative oil, capable of forming a tough film on exposure but free from material pellicle forming tendencies in a closed container.

7. A varnish product consisting of a siccative composition of the consistency of varnish comprising a remelted, cracked, dissolved hard varnish resin, and a sulfured drying oil, a drier and a thinning vehicle.

8. A varnish composition containing sulfured Chinese wood oil which is substantially or essentially free from pellicle-formation in a closed container.

9. A varnish having substantially the properties of a spar varnish but with enhanced waterproofing qualities and containing remelted resin and a sulfured Chinese wood oil soluble in turpentine.

Signed at Long Island city in the county of Queens and State of New York this 29th day of December A. D. 1914.

CHARLES A. HOLLENBECK.
AARON C. HORN.

Witnesses:
J. F. HAMMOND,
JNO. H. SCHUBERT.